(No Model.)

A. E. STIRCKLER.
ROTARY CUTTER.

No. 309,005. Patented Dec. 9, 1884.

Witnesses.
Lauritz N. Möller
John R. Snow

Inventor.
Albert E. Stirckler
by his attorney
J. E. Maynader

United States Patent Office.

ALBERT E. STIRCKLER, OF BOSTON, MASSACHUSETTS, ASSIGNOR TO THE BUSELL TRIMMER COMPANY, OF SAME PLACE.

ROTARY CUTTER.

SPECIFICATION forming part of Letters Patent No. 309,005, dated December 9, 1884.

Application filed June 9, 1884. (No model.)

*To all whom it may concern:*

Be it known that I, ALBERT E. STIRCKLER, of Boston, in the county of Suffolk and State of Massachusetts, have invented a new and useful Improvement in Rotary Cutters, of which the following is a specification.

My invention relates to improvements in rotary cutters used for trimming sole-edges.

The objects of my improvements are to simplify the construction by forming the guard for each tooth integral with the tooth, and to enable the teeth to be set back to give the requisite clearance without displacing the guard. Heretofore the guard has usually been formed by the rear end of each tooth, and consequently its relation to the cutting-edge of its tooth varied as the tooth was set back for clearance. To obviate this, independent guards have been inserted between them.

In my improved cutter the cutting-edge of the tooth is adapted to be set back without correspondingly moving the guard by means of a slit cut between the cutting-edge and rear end of each tooth, as indicated in the accompanying drawings, in which—

Figure 1:
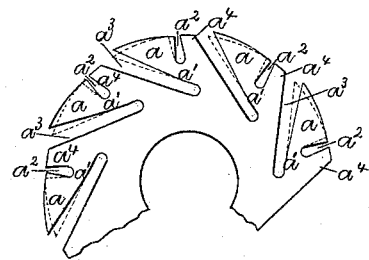
Figure 2:
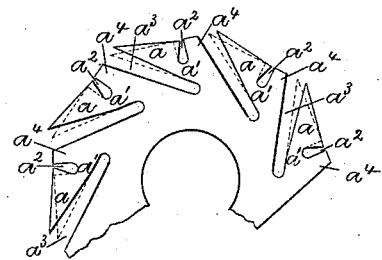
Figure 3:
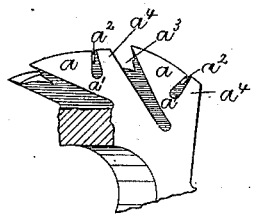
Figure 4:
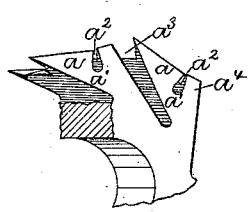

Figure 1 shows a portion of a cutter with the teeth curved. Fig. 2 shows a portion of cutter with flat teeth. Figs. 3 and 4 are perspective views of two teeth of Figs. 1 and 2, respectively.

The teeth $a$ are first cut in the usual way. Slits $a^2$ are then cut substantially as shown, so as to leave the weakest place, $a'$, at the bottom, between the slits $a^2$ and the slits $a^3$ and between the teeth $a$.

The dotted lines in Figs. 1 and 2 indicate the positions of the teeth when first formed by the slits $a^2$ and $a^3$ cut into the disk or hub of metal.

It will be apparent that on setting or bending back the teeth $a$ to give clearance, as shown by the full lines in Figs. 1 and 2, that all the bend will occur at the weakest point, $a'$, thereby enabling any desired clearance to be given to the cutting part of the teeth without moving the rear part, $a^4$. The rear part, $a^4$, forms a fixed and independent guard always in proper relation to the cutting-edge of its tooth to limit the rankness of the cut. Guards so formed admit of the teeth being sharpened by grinding off their front faces to a greater extent than any of the guards heretofore used, and greatly increase the durability compared to that of cutters in which the rear end of the teeth moved with the cutting-edge, and no change of guard is required when the teeth are ground down, as in cutters provided with independent guards.

I claim as my invention—

The improved rotary cutter above described, having a slit formed in each tooth between the cutting-edge and rear end thereof, substantially as and for the purpose set forth.

ALBERT E. STIRCKLER.

Witnesses:
W. A. COPELAND,
JOHN R. SNOW.